H. A. GRAEFF.
CORN SHELLER.
No. 66,485. Patented July 9, 1867.
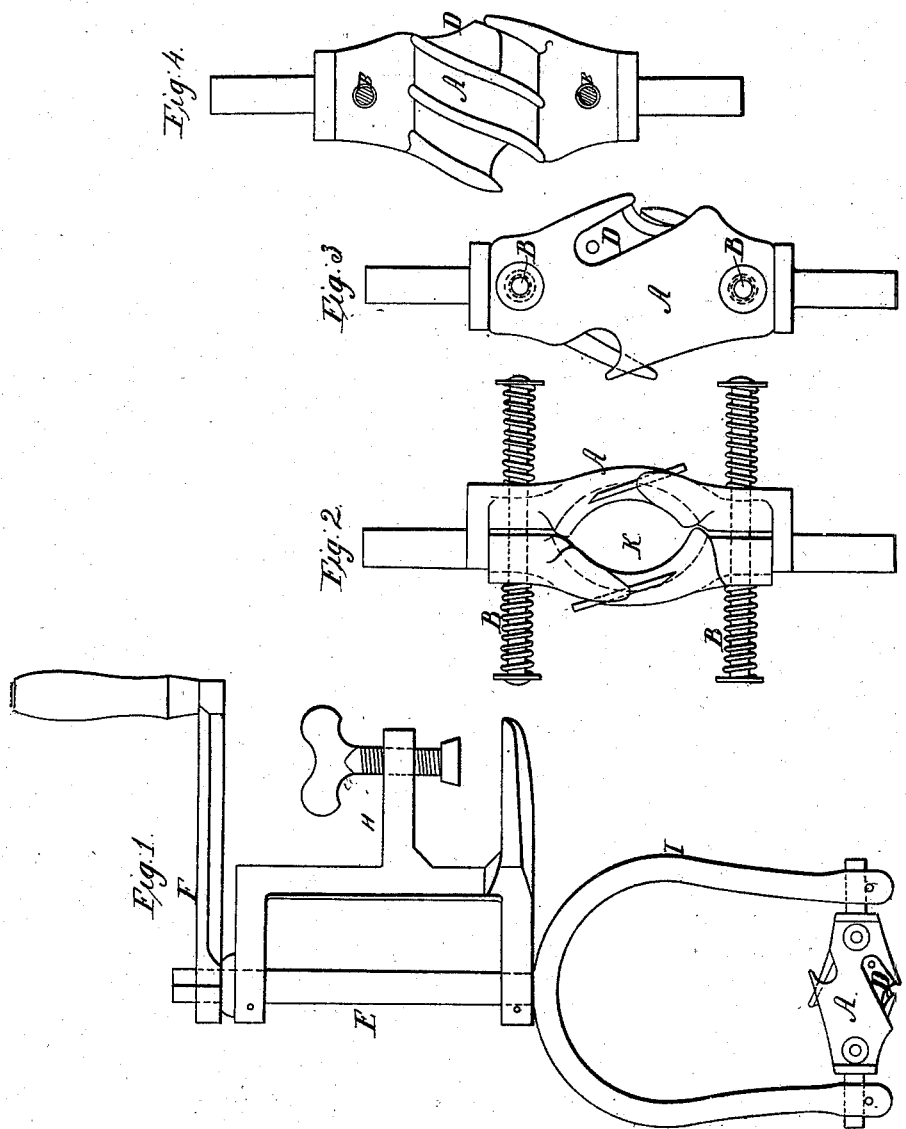
Witnesses:
L. B. Branner
A. K. Stauffer
Inventor:
H. A. Graeff

United States Patent Office.

HENRY A. GRAEFF, OF BIRDSBORO, PENNSYLVANIA.

Letters Patent No. 66,485, dated July 9, 1867.

IMPROVEMENT IN CORN-SHELLERS.

*The Schedule referred to in these Letters Patent and making part of the same.*

TO ALL WHOM IT MAY CONCERN:

Be it known that I, HENRY A. GRAEFF, of Birdsboro, county of Berks, and State of Pennsylvania, have invented a new and useful Improvement on Machines for Shelling Corn and Cutting Green Corn from the Cob; and I do hereby declare that the following is a full, clear, and exact description of the construction and operation of the same, reference being had to the annexed drawings, making a part of this specification, in which—

Figure 1 is a perspective view.
Figure 2, a front view of the shellers.
Figure 3, a side view of the shellers; and
Figure 4, an inside view of the shellers and thread.

The nature of my invention consists in the arrangement and combination of the shellers A, in figs. 1, 2, 3, and 4, with two wire springs, B, in figs. 1, 2, 3, and 4, so as to adjust itself to the size of the ears of corn, together with the knife D, in figs. 1, 2, 3, and 4, for cutting green corn from the cob, and the shellers being attached, as shown in fig. 1, will greatly facilitate the shelling and cutting of green corn from the cob by hand, and which can be done with less labor and expense than any other mode now used for said purposes.

To enable others skilled in the art to make and use my improvement, I will proceed to describe its construction and operation.

I construct my machine in the form as represented in fig. 1, which is made of cast iron. F represents the crank with which the shellers are worked; H the screw by which the machine is fastened upon a tub or other vessel; E I the fork to which the shellers are attached; A, in figs. 1, 2, 3, and 4, the different views of the shellers, and which are also of cast iron, with a thread, as shown in fig. 4, to draw the corn through. D, in figs. 1, 2, 3, and 4, represents the knife, which is made of steel, and wedged in the sheller, as shown in fig. 3. B represents the wire springs, as shown in fig. 2, which enlarge or contract the shellers A.

Having thus described the different parts of my machine, I fix the same to a tub or other vessel, and with one hand turn the crank F, which gives a rotary motion to the shellers A, and with the other hand I introduce the ear of corn in the orifice K, as shown in fig. 2, and when half shelled I reverse it and hold the cob until the other part is shelled. When used for cutting green corn from the cob, I place it, in the same manner as already described, on that side where the knife is attached, as shown in fig. 3, D, and which revolves the knife around the corn, and cutting the same from the cob.

What I claim as my improvement, and desire to secure by Letters Patent, is—

The arrangement and combination as above set forth, with which the shellers A, in figs. 1, 2, 3, and 4 are attached and worked by the fork E I, in fig. 1, together with the knife D, in fig. 3, for cutting green corn from the cob.

H. A. GRAEFF.

Witnesses:
  J. B. WANNER,
  A. K. STAUFFER.